Nov. 19, 1929.   N. A. HALLWOOD   1,736,079
SCALE
Filed Oct. 15, 1927   4 Sheets-Sheet 3
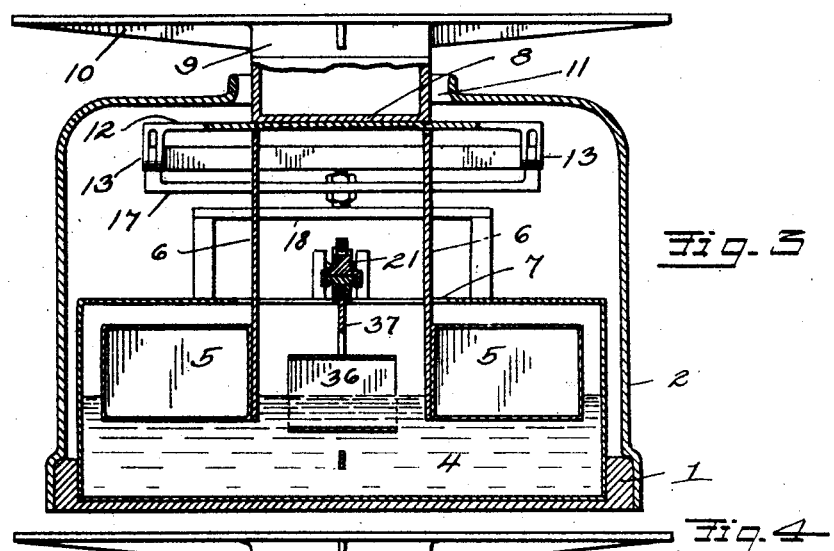
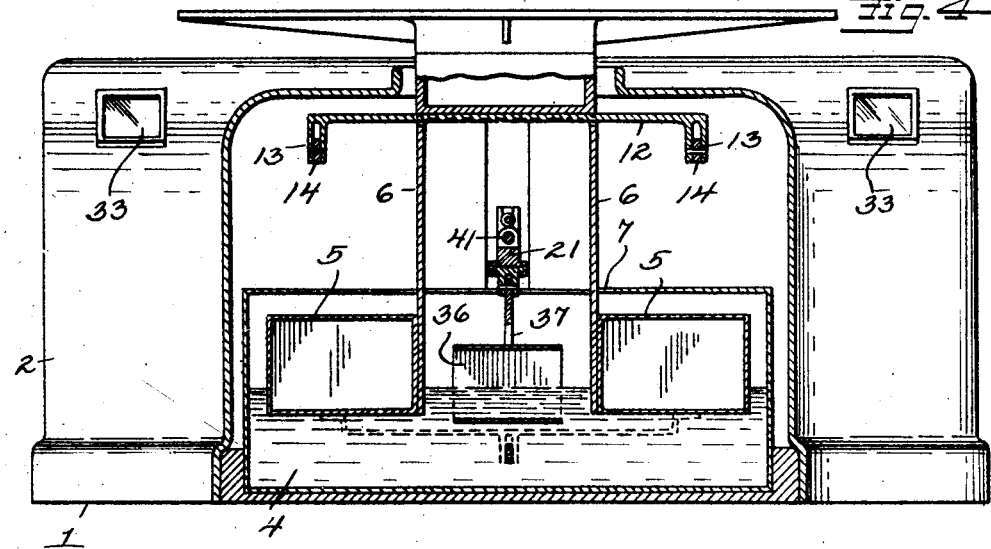
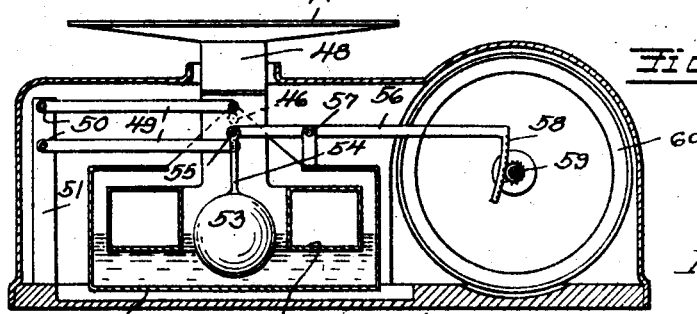
Inventor
N. A. Hallwood
By W. A. McDowell
Attorney Nov. 19, 1929.  N. A. HALLWOOD  1,736,079
SCALE
Filed Oct. 15, 1927  4 Sheets-Sheet 4
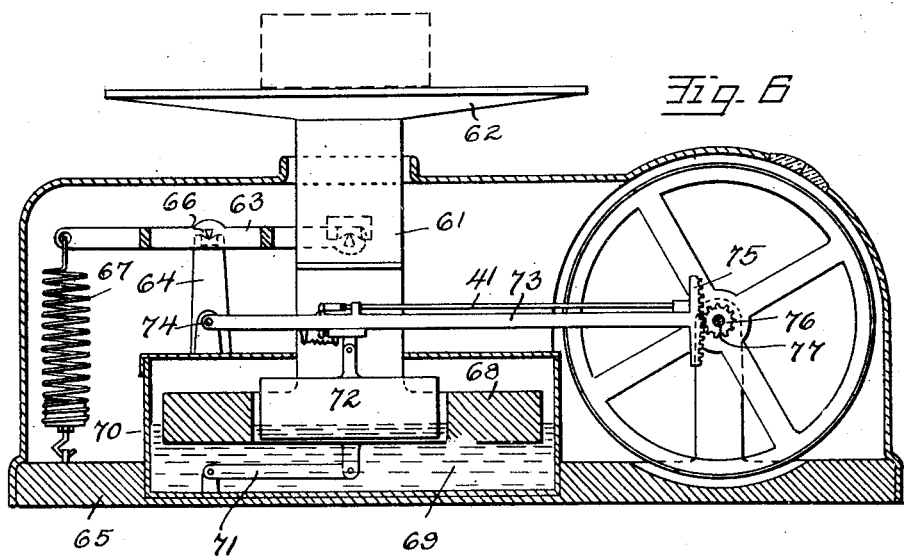
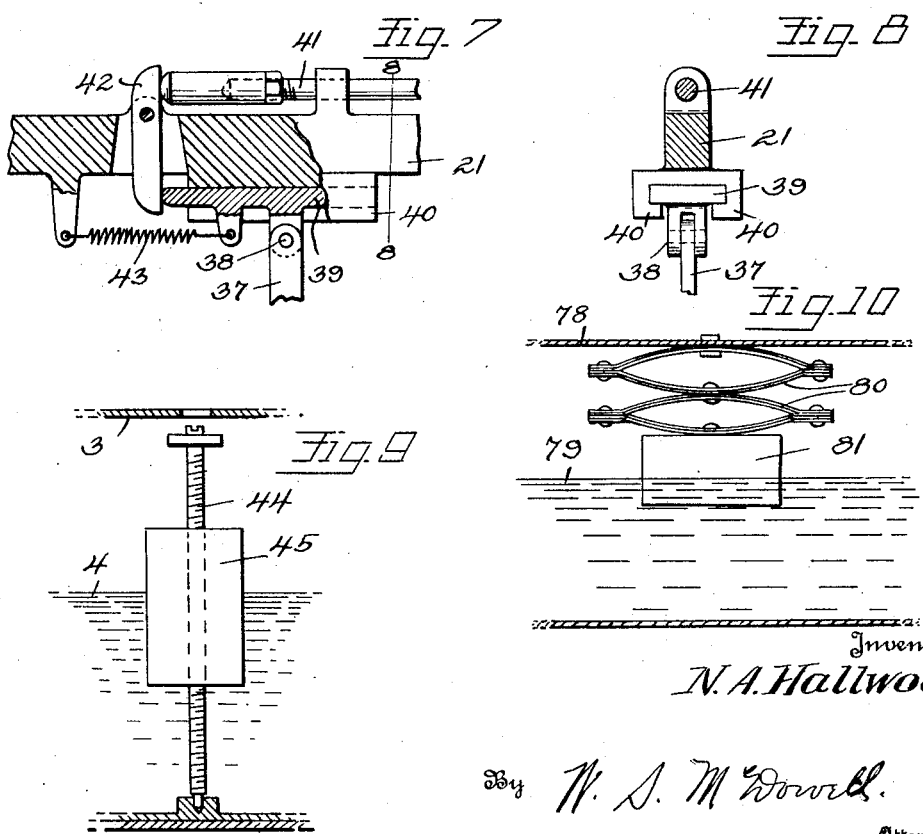
Inventor
*N. A. Hallwood*
By *W. S. McDowell*
Attorney Patented Nov. 19, 1929

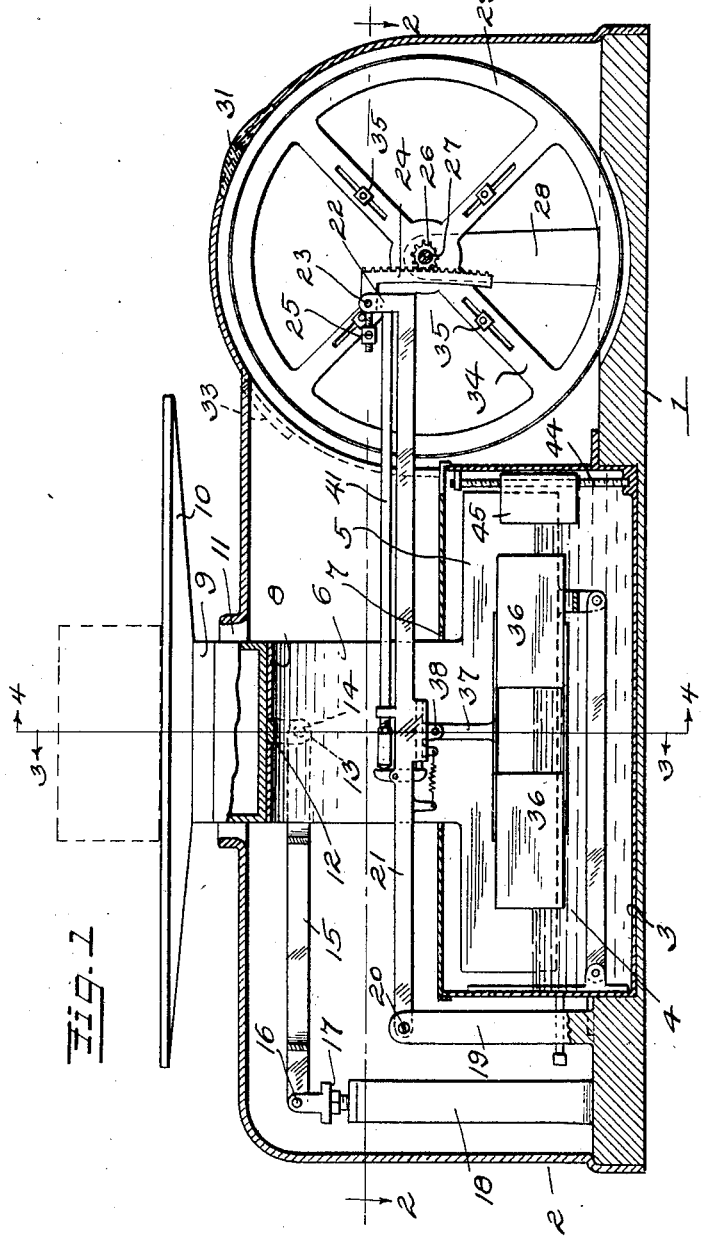

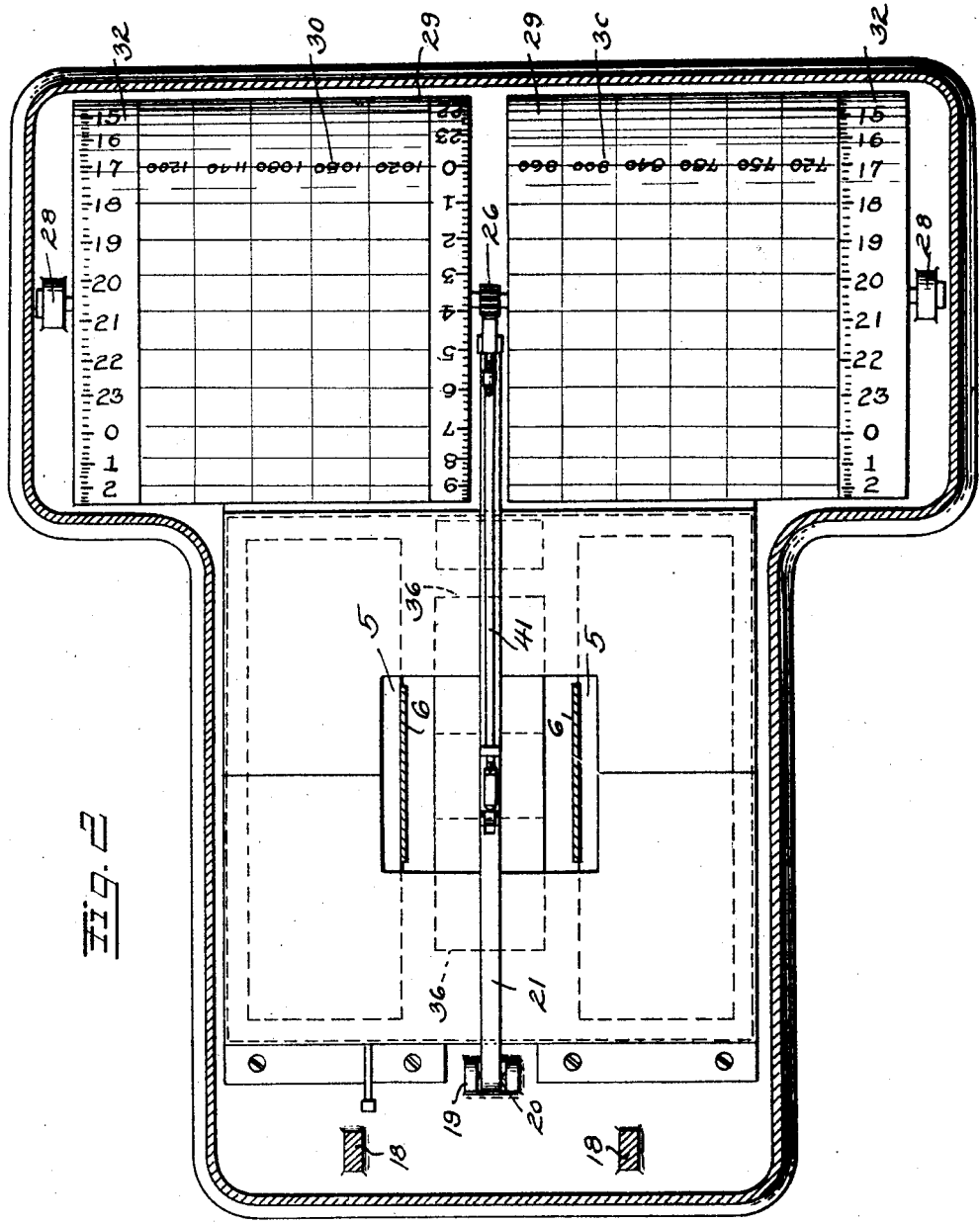

1,736,079

UNITED STATES PATENT OFFICE

NATHAN A. HALLWOOD, OF COLUMBUS, OHIO

SCALE

Application filed October 15, 1927. Serial No. 226,342.

This invention relates to improvements in scales and has for its object the provision of a weighing scale wherein the weight receiver is buoyantly supported by a body of liquid, and wherein the displacement of the liquid, effected through the application of weight to the weight receiver, is utilized for the purpose of effecting the operation of an associated indicating mechanism.

Another object of the invention resides in a scale of this type which will operate accurately without necessitating the maintenance of the same in a true horizontal plane, the construction being such as to compensate automatically for the practical variations encountered in the level of counters and other types of scale supports.

A further object of the invention resides in the provision of thermostatic means for maintaining the accuracy of the scale throughout a wide range of temperature variations and variations in the physical state of the operating liquid.

With these and other objects in view, as will appear as the description proceeds, the invention consists in the novel features of construction, combinations of elements and arrangements of parts hereinafter to be more fully described and pointed out in the appended claims.

In the accompanying drawings:

Figure 1 is a vertical sectional view taken through a scale constructed in accordance with the present invention, Figure 2 is a horizontal sectional view taken through the scale on the line 2—2 of Figure 1, Figure 3 is a transverse vertical sectional view taken through the scale on the line 3—3 of Figure 1, Figure 4 is a similar view on the line 4—4 of Figure 1, Figure 5 is a vertical sectional view taken through a modified type of scale, Figure 6 is a similar view of a further modification, Figure 7 is an enlarged detail vertical sectional view disclosing the thermostatic means for controlling the operating position of the float and indicating arm, Figure 8 is a transverse sectional view on the line 8—8 of Figure 7, Figure 9 is a detail view of the adjustable displacement member used in sealing the scale, Figure 10 is a detail view of a modified form of thermostatic means.

Referring more particularly to the drawings the numeral 1 designates the base of the scale to the marginal edges of which there is applied a housing or casing 2. Mounted upon the base 1 and arranged within the housing or casing is a tank 3, which is adapted to contain an operating liquid such as alcohol, mercury or any other suitable non-compressible fluid, mercury being preferred, however, because of its greater stability.

Buoyantly supported by the body of liquid 4 within the tank is a pair of spaced longitudinally extending floats 5 to which are secured the lower ends of a pair of vertical legs 6, which extend upwardly through an opening 7 provided in the top of the tank and terminate in a transversely extending cross-web 8, the latter being secured to the lower portion of a stem 9 carried by and rigidly depending from the central portion of a weight receiver 10. The stem 9 is loosely positioned for sliding movement within an opening 11 formed in the top of the casing or housing 2 and the weight receiver may be of any suitable design best adapted for the bodies or articles to be deposited thereon. By this construction it will be seen that the weight receiver floats as it were on the liquid body 4 and that since the liquid is confined within the walls of the tank 3 the application of varying weights to the weight receiver will result in the rise and fall of the liquid level within the tank 3 with respect to a predetermined normal. I utilize this displacement of the liquid to effect the operation of an associated indicating mechanism hereinafter set forth.

To guide the movement of the weight receiver the bottom of the stem 9 has connected therewith a transversely extending bar 12, which terminates in spaced downwardly projecting ears 13, to which are pivoted as at 14 the outer end of a beam 15. The inner end of this beam is pivoted as at 16 to an adjustable yoke 17 which is carried by an upright 18 arranged rigidly on the base 1.

The base 1 is also provided with a second upright 19 to the upper end of which is pivotally connected as at 20 an indicator operating arm 21. The outer end of this arm is provided with an upstanding portion 22 to which is pivoted as at 23 a floating segmental rack 24. One arm of this rack is provided with an adjustable weight 25, which tends to swing the rack about its pivot 23 in order that the teeth of the rack may be maintained in uniform engagement with a pinion 26 which is fixed upon a drum shaft 27, the latter being journaled in connection with bearing supports 28 carried by the base 1.

The shaft 27 is provided with a pair of spaced drums 29 which bear weight and price computing indicia 30. The drums are revolved by the swinging action of the arm 21 in response to weight applied on the receiver 10, and the indicia on the drum may be read through a main reading lens 31 formed in connection with the casing 2. The outer ends of the drums are provided with supplemental weights indicating indicia 32, and this may be read through a pair of lenses 33 carried by the casing 2 on the opposite side of the drums 29 as regards the lens 31. The indicia indicated at 32 preferably sets forth merely the weight of the material in pounds or ounces, whereas the indicia 30 set forth both the weights and price data. The drums are provided with the usual spiders 34, the arms of which being formed to include adjustable weights 35 by means of which the desired balance of the drums may be obtained.

In order to transmit motion from the weight receiver to the indicating mechanism to the displacement of the liquid within the tank 3, I locate within said tank a second pair of floats 36, which are situated between the weight receiver floats 5. The floats 36 are connected with an upstanding arm 37, which is pivotally secured as at 38 to an adjustable chair plate 39. This plate is slidably mounted within guides 40 carried by the arm 21, and the operating positions of the plate 39 may be varied automatically to compensate for differences in temperature, which may affect the density of the operating fluid. It will be seen that by shifting the plate 39 back and forth the distance between the point of pivotal connection 38 and the point of pivotal connection 20 between the arm 21 and the upright 19 may be varied in order that when relatively high temperature conditions prevail greater movement on the part of the float will be required to move the indicator through equal increments of travel. Liquids tend to become more dense as the temperature thereof is lowered, consequently more load will be required to submerge the float at lower temperatures than at higher temperatures with the same liquid. By a thermostatic control this condition is taken care of automatically and the scale rendered accurate through a wide temperature range.

To effect the movement of the plate 39 the arm 21 carries a thermostatic rod 41, the free end of which impinges upon a pivoted lever 42 carried by the arm 21. The other end of this lever is maintained in contact with one end of the plate 39, and a coil spring 43 acts on the plate 39 so as to maintain the latter normally in contact with the lever 42. It will be seen that as the rod 41 expands or contracts in response to temperature changes, the lever 42 will be oscillated so as to move the plate 39 and to thereby vary the distance between the pivots 19 and 38.

Another feature of the construction resides in the manner of forming the floats 5 and 36. By their relative construction and arrangement the positions of the floats will be maintained even in the event the base 1 is tilted to some extent from the true horizontal. In other words the floats are disposed equidistantly with respect to the center of the body of liquid within the tank so that the scale may be positioned to a very decided extent out of a true horizontal plane without affecting its operation or weighing accuracy.

To secure the sealing of the scale, i. e., the accurate positioning of the drum 29 in response to known or predetermined weights, the tank 3 is provided adjacent to one side thereof with a vertically journaled part 44, which carries a body 45 having a threaded opening for the reception of the screw. By rotating the screw the body 45 will be caused to travel vertically, thereby displacing the liquid within the tank to a greater or lesser extent so that the float may be properly positioned for the most effective operation.

In the modified form of the invention disclosed in Figure 5 the tank $3^a$ instead of being fixed upon the base 1 is pivotally suspended as indicated at 46 from the base 1 or other suitable point of support. The weight receiver 47 has its stem 48 connected with a pair of check links 49, which have certain of their ends pivoted as at 50 to an upright 51 and their opposite ends pivoted to the stem 48.

The bottom of the stem terminates in a substantially rectangular float 52, which is buoyantly supported upon the body of the liquid contained within the tank $3^a$. The liquid thus serves to support the weight receiver and is displaced, as in the preferred form, by the application of weight to the receiver 47.

Arranged within the float 52 is a ball float 53 from which projects an upstanding stem 54, the latter being pivotally connected as at 55 with a connecting rod arm 56. This arm is pivoted as at 57, intermediate of its length, to a bracket mounted on the crank casing. The outer end of the arm 56 terminates in a segmental rack 58 which is adapted to engage with the drum shaft pinion 59. By this construction the tank and float mechanism is permited to shift automatically in response to variations in the horizontal level of the base of the scale for the purpose of maintaining the indicating drum 60, when the scale is unweighted, at its zero position whether the base occupies a true horizontal plane or not.

In the form of the invention illustrated in Figure 6 the stem 61 of the weight receiver 62 rests upon one end of a pivoted beam 63. This beam is carried by a support 64 arising from the base 65 of the scale, and the beam 63 is pivotally mounted as at 66 upon the upper end of the support. The outer end of the beam is connected with a spring 67 which acts to resist the weight applied to the receiver 62.

The bottom of the stem 61 is provided with a float 68 which buoyantly rests upon a body of liquid 69 arranged within the stationary tank 70, a check rod 71 being pivotally connected with the bottom of the stem and also with the tank 70 in registration with the beam 63.

When weights are applied to the receiver 62 the latter is depressed against the resistance offered by the spring 67. The movement of the receiver, however, is imparted directly to the float 68 resulting in the displacement of the liquid 69 in the tank 70. This produces corresponding changes in the operating positions of a second float 72 which, through the mechanism shown in Figure 7, has a thermostatic connection with an indicator arm 73. This arm is pivotally mounted as at 74 and has its outer end provided with a rack 75 arranged for engagement with a pinion 76 mounted on an indicating drum shaft 77. In this form of the invention the weight controls on the receiver 62 are absorbed by the spring 67 and the liquid in the tank 70 is utilized through displacement thereof to transmit motion from the weight receiver to the indicating mechanism.

In Figure 10 a tank 78 has been disclosed containing a body of liquid 79, and the top of the tank has connected therewith a plurality of thermostatic elements 80, to which are connected a weight or other body 81. By this construction when temperature changes take place with corresponding changes in the density of the liquid, the level of the latter is automatically changed so as to maintain the true weighing positions of the scale. In this respect the construction disclosed in Figure 10 may be employed in lieu of that set forth in Figure 7 or in conjunction therewith.

It should be understood, however, that my invention is not based upon nor dependent upon the theory which I have expressed, nor is the invention to be regarded as limited to the precise details of construction mentioned in the foregoing, these details being given only by way of illustration and to aid in making the invention more readily understood. I do not regard such specific details as essential to the invention except in so far as they are expressed by way of limitation in the appended claims, in which it is my intention to claim all novelty inherent in the invention as broadly as is permissible in view of the prior art.

What is claimed is:

1. In a scale, a base provided with a liquid containing chamber, a weight receiver including a stem, a float connected with said stem and immersed in the liquid within said chamber, a pivoted check rod connected with said float and said base, a second check rod pivotally connected with said stem and said base, a second float arranged within said chamber and immersed in said liquid, said second float having no direct connection with said first named float, an indicating mechanism, and means operated by said second named float for effecting the operating of said indicating mechanism.

2. In a scale, a base provided with a liquid containing receptacle, a weight receiver, a displacement member connected with said receiver and arranged within said receptacle, said member being movable in response to weights applied to said receiver to displace the liquid within said receptacle, a float buoyantly supported by the liquid within said receptacle, an indicating mechanism, means operated by said float for governing the working positions of said indicating mechanism, and a shiftable thermostatic connection between said float and the means for operating said indicating mechanism.

3. In a scale, a base provided with a liquid containing receptacle, a weight receiver, a liquid displacement member connected with the lower portion of said receiver, said displacement member being arranged within said receptacle for engagement with the body of liquid confined therein, a float supported upon the body of liquid arranged within said receptacle, said float being immersed half way into the liquid and positioned in the center of said receptacle thus being uninfluenced by the longitudinal level of said base, an indicating mechanism, and means operated by said float and through the displacement of said liquid for governing the working position of said indicating mechanism.

4. In a scale, a base, a liquid containing receptacle mounted on said base, a weight receiver, a liquid displacement member connected with said receiver, said displacement member being disposed within said receptacle in engagement with the body of liquid therein, a float independent of said displacement member and responsive to the rise and fall of the liquid within said receptacle to change its operating positions, an indicating mechanism, a pivotally mounted arm carried by said base for operating said indicating mechanism, and a connection between said float at an intermediate part of said arm.

5. In a scale, a base, a liquid container on said base, a weight receiver movably mounted with respect to said base, a displacement member connected with said weight receiver and arranged to engage with the liquid in said container to effect displacement of the latter in response to different weights applied to said receiver, a float buoyantly supported by the body of liquid within said container, an indicating mechanism comprising a drum, an arm pivoted to said base at one end and having its opposite end provided with gearings for rotating said drum, and a connection between said float at an intermediate portion of said arm.

6. In a scale, a base, a liquid container mounted on said base, a weight receiver movable with respect to said base, a displacement member arranged within said container and connected with said weight receiver, a second float arranged within said container, an indicating mechanism, a movable member for operating said indicating mechanism, and a thermostatically operating connection between said float and said member for operating the indicating mechanism.

In testimony whereof I affix my signature.

NATHAN A. HALLWOOD.